Sept. 1. 1931.       H. D. SIMPSON       1,821,676
                      CHAIN STRAP
                    Filed Jan. 5, 1929
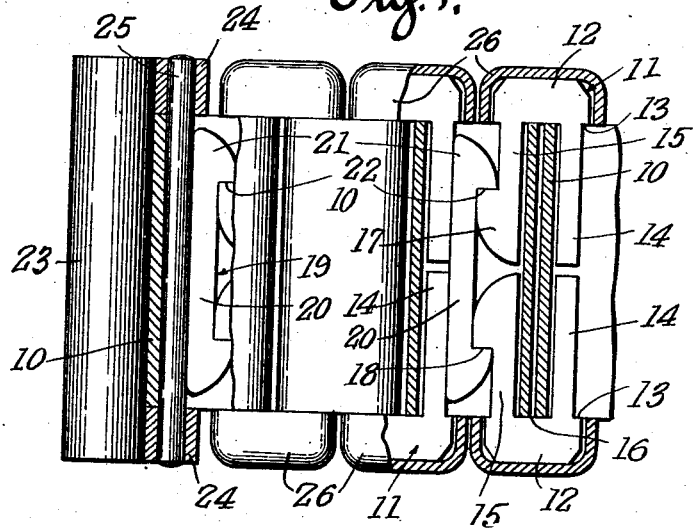
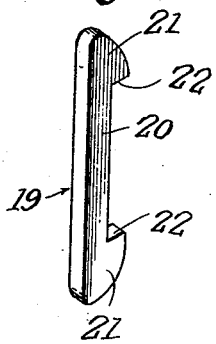
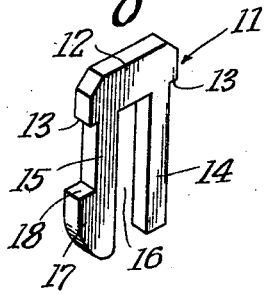
INVENTOR
Harrison D. Simpson
BY
Hervey Barber McKee
ATTORNEYS Patented Sept. 1, 1931

1,821,676

UNITED STATES PATENT OFFICE

HARRISON D. SIMPSON, OF NEWARK, NEW JERSEY, ASSIGNOR TO KREMENTZ & COMPANY, OF NEWARK, NEW JERSEY, A CORPORATION OF NEW JERSEY

CHAIN STRAP

Application filed January 5, 1929. Serial No. 330,462.

This invention relates to flat link chains for ornamental purposes, such as belts, bracelets, wrist watch bands and other like articles of personal adornment and wear.

The object of the present invention is to provide a series of links united in such manner as to be readily flexed in the direction of length of the chain, thus conforming to the object to which it may be applied. Also to produce a chain in which the several visible elements may be engraved, stamped, enamelled or otherwise ornamented prior to assembly, and when assembled to possess unusual strength compared with other chains of a similar character.

Furthermore, as each part is formed from sheet metal or tube, the construction is quite economical.

The present invention has as its particular feature the provision of a chain easily capable of being lengthened or shortened by the addition or removal of one or more links as may be required, such length adjustment being readily accomplished.

These several objects are attained by the novel and practical design, construction and combination of simple sheet metal parts as are hereinafter fully described and illustrated in the annexed drawings forming a component hereof, and in which:

Figure 1 is a plan view of a portion of chain made in conformity with the invention, parts being broken away to show the construction.

Figure 2 is a perspective view of one of the link connector elements in detail.

Figure 3 is a similar perspective view of a co-operative connector or yoke.

The chain is composed of a series of links 10, each formed of equal length from a metal tube flattened to present two spaced parallel sides joined by semi-circular edges.

These tubes are preferably seamless and obviously may be plated, enamelled or otherwise ornamented, either uniformly or diversely as preferred.

The connector elements are of two different forms, as shown in detail in Figures 2 and 3, two of the latter being used with each link and one of the former.

The form shown in Figure 3, and also the assembly view in Figure 1, consists of a flat sheet metal punching, generally designated by the numeral 11 having a head or connecting bar 12, provided with beveled outer corners or otherwise and having on their inner edges, slightly offset inwardly from the ends of the bar, as at 13, a fork consisting of two parallel prongs 14 and 15, a space 16 intervening.

The prong 14 is formed with a square end, its length being slightly less than half the length of the tube 10, while the prong 15 has on its outer edge a hook-like lug 17, having a right angled face 18, the end of the lug and prong being convexly curved and equal in length to the prong 14.

Two of these elements are used with each link, one being placed opposite the other in such manner that the prongs 14 engage in one tube and the prongs 15 in the next adjacent tube, the curved edge walls of the tubes entering the spaces 16 and seating on their bottoms thus connecting the tubes in pairs.

In order to lock the elements 11 in their assembled relation, the other connector element or yoke 19 is employed, the same consisting of a sheet metal punching, of uniform thickness with the elements 11, presenting a central straight bar portion 20 having hook elements 21 at each end provided with right angled adjacent faces 22, equivalent in length to the faces 18.

In assembling the chain, the connector elements 11 are first placed in position and thereafter the single connector element 19, which is pressed towards the prongs 15, until the hook members 17 and 22 are fully engaged, thereafter the next pair of elements 11 are entered so that their prongs 14 contact with the rear or outer edge of the bar 20, locking the same in place and so continuing until the chain has been completed.

The chain may be finished at its end by any preferred metal part, as the tube 23, the same having lugs 24 on one side near its end, the lugs being spaced apart to equal the length of the tube 10, entered therebetween and secured by a pin 25 passed through the lugs and tube, the pin acting as a connector and also to retain the outermost element 19 in operative position.

From the foregoing it will be seen that by removal of the pin 25, one or more links may be added or subtracted, thus adjusting the length of the chain without mutilation or difficulty.

While the heads 12 of the connecting elements may appear at the edges of the chain, and be ornamented as desired, a series of drawn sheet metal caps 26 may preferably be employed, the same being similar in width and thickness to the tubes 10, and fitted to be pressed firmly upon the heads 12 to remain in position thereon, these caps obviously being in offset relation to the tubes and affording a well rounded and smooth edge to the chain.

From the foregoing the simplicity of the parts of the chain and ease of assemblage will be apparent, as well as its strength and capacity for ornamentation, while its adaptability for length adjustment is also obvious; nevertheless minor changes within the scope of the appended claims may be resorted to.

Having thus described my invention, what I claim as new and desire to secure by Letters Patent, is:

1. A chain comprising a series of flattened tubular links, forked connectors engaging said links progressively and from opposite ends, yokes coupling said connectors, and means on succeeding connectors to retain said yokes in operative position.

2. A chain comprising a series of flattened tubular links, two pronged connectors engaging pairs of said links progressively, said connectors having heads extending beyond the tubes to form the edges of the chain, lugs on one of the prongs of each connector, and a yoke bar engaging the lugs of each opposed pair of connectors, the other prongs of said connectors retaining said yoke bars in operative position.

3. A chain comprising a series of flattened tubular links, forked connectors engaging said links in progressively paired relation and provided with lugs, and means to retain said connectors in operative relation, said means including yokes held by lugs engaging the lugs on the said forked connectors.

4. A chain comprising a series of flattened tubular links, forked connectors provided with lugs and engaging said links in progressively paired relation from opposite ends thereof, and yoking means provided with lugs for engagement with the lugs on the said forked connectors.

5. An ornamental chain presenting like sides composed of flattened tubular links, connectors provided with lugs and enterable from opposite ends of said links to retain the same in coupled relation, heads on said connectors forming the longitudinal edges of the chain, and removable means provided with lugs for engagement with the lugs on the said forked connectors to retain said connectors when entered in the links.

In testimony whereof I have hereunto affixed my signature.

HARRISON D. SIMPSON.